US011789886B2

(12) United States Patent
Elend et al.

(10) Patent No.: US 11,789,886 B2
(45) Date of Patent: Oct. 17, 2023

(54) CONTROLLER AREA NETWORK DEVICE

(71) Applicant: NXP B.V., Eindhoven (NL)

(72) Inventors: Bernd Uwe Gerhard Elend, Hamburg (DE); Matthias Berthold Muth, Stelle (DE); Thierry G. C. Walrant, Bouge (BE)

(73) Assignee: NXP B.V., Eindhoven (NL)

( * ) Notice: Subject to any disclaimer, the term of this patent is extended or adjusted under 35 U.S.C. 154(b) by 14 days.

(21) Appl. No.: 17/657,069

(22) Filed: Mar. 29, 2022

(65) Prior Publication Data

US 2022/0318178 A1    Oct. 6, 2022

(30) Foreign Application Priority Data

Mar. 31, 2021  (EP) .................................... 21166437

(51) Int. Cl.
*G06F 13/40*   (2006.01)
*H04L 12/40*   (2006.01)

(52) U.S. Cl.
CPC .......... *G06F 13/4068* (2013.01); *H04L 12/40* (2013.01); *H04L 2012/40215* (2013.01)

(58) Field of Classification Search
CPC ...... G06F 13/4068; H04L 12/40; H04L 63/14
See application file for complete search history.

(56) References Cited

U.S. PATENT DOCUMENTS

| | | |
|---|---|---|
| 9,954,892 B2 | 4/2018 | Elend |
| 10,361,934 B2 | 7/2019 | Elend et al. |
| 2017/0093659 A1* | 3/2017 | Elend .................. H04L 63/1416 |

FOREIGN PATENT DOCUMENTS

| | | |
|---|---|---|
| EP | 3358803 A1 | 8/2018 |
| WO | WO-2019227076 A1 | 11/2019 |

OTHER PUBLICATIONS

"International Standard ISO 11898-1, Second Edition, Road vehicles—Controller area network (CAN)—Part 1: Data link layer and physical signalling"; 75 pages (Dec. 15, 2015), pp. 5-7, 31.

* cited by examiner

*Primary Examiner* — Idriss N Alrobaye
*Assistant Examiner* — Ronald T Modo

(57) ABSTRACT

A Controller Area Network, CAN, device comprising: a compare module configured to interface with a CAN transceiver, a CAN decoder configured to decode an identifier of a CAN message received from the RXD input interface; an identifier memory configured to store an entry that corresponds to at least one identifier; compare logic configured to compare a received identifier from a CAN message to the entry that is stored in the identifier memory and to output a match signal upon a match; a signal generator configured to output, in response to the match signal, a signal to invalidate the CAN message, wherein the signal is output from the TXD output interface to the CAN transceiver; and wherein the signal generated by the signal generator provides for one or more dominant bits that are timed so that at a bit immediately following a FDF field or the FDF field bit is made dominant.

20 Claims, 12 Drawing Sheets

CONTROLLER AREA NETWORK DEVICE

CROSS-REFERENCE TO RELATED APPLICATIONS

This application claims the priority under 35 U.S.C. § 119 of European patent application no. 21166437.0, filed Mar. 31, 2021 the contents of which are incorporated by reference herein.

FIELD

The present disclosure relates to controller area network device. In particular, one or more examples relates to a controller area network device that is configured to interface with a CAN transceiver, such as couple to or form part of the CAN transceiver, to enable the invalidation of CAN messages.

BACKGROUND

Controller area network (CAN) bus is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898-1. CAN FD, an extension to the CAN protocol, is part of ISO11898-1:2015. Under development is "CAN XL", which is scheduled to be integrated into the CAN protocol in due course.

One growing concern with in-vehicle networks, such as in-vehicle networks that use the CAN bus protocol, is network security, including intrusion detection and intrusion prevention. For example, a compromised in-vehicle network could allow an attacker to maliciously control components of a vehicle.

SUMMARY

According to a first aspect of the present disclosure there is provided a Controller Area Network, CAN, device comprising:
 a compare module configured to interface with a CAN transceiver that is configured to be coupled to a CAN bus, the compare module having;
 a receive data, RXD, input interface configured to receive data from the CAN transceiver;
 a transmit data, TXD, output interface configured to output data to the CAN transceiver;
 a CAN decoder configured to decode an identifier of a CAN message received from the RXD input interface;
 an identifier memory configured to store an entry that corresponds to at least one identifier;
 compare logic configured to compare a received identifier from a CAN message to the entry that is stored in the identifier memory and to output a match signal when the comparison indicates that the received identifier of the CAN message matches the entry that is stored at the CAN device;
 a signal generator configured to output, in response to the match signal, a signal to invalidate the CAN message, wherein the signal is output from the TXD output interface to the CAN transceiver;
 wherein the signal generated by the signal generator provides for one or more dominant bits that are timed so that at least one of: one or more bits at bit positions immediately following a FDF field is made dominant; and the FDF field is made dominant.

In one or more embodiments, said signal is configured to cause said CAN transceiver to provide signalling to the CAN bus that provides said one or more dominant bits that are timed so that at least the bit immediately following a FDF field or FDF field of the CAN message is made dominant.

In one or more embodiments, said signal generator is configured to provide signalling to the CAN bus that provides said one or more dominant bits that are timed so that at least the bit immediately following a FDF field or FDF field of the CAN message is made dominant.

In one or more embodiments,
 the CAN decoder is further configured to decode the bit immediately following a FDF field of a CAN message received from the RXD input interface;
 the compare logic is configured to determine whether or not said bit is recessive and to output a disable signal when said bit is recessive; and
 the CAN device, in response to the disable signal, is configured to prevent transmission by the CAN transceiver to the CAN bus until a beginning of an ACK slot or until an indication that the bit rate used on the bus is below a threshold rate.

In one or more examples, said indication that the bit rate used on the bus is below a threshold rate comprises information indicating use of a classical CAN bit rate, i.e. not the faster rates provided by CAN FD and CAN XL.

In one or more embodiments, said CAN device is configured to prevent transmission by the CAN transceiver by one or more of:
 blocking signalling from a CAN protocol controller from onward transmission to the CAN transceiver, wherein the compare module further includes a transmit data, TXD, input interface configured to receive data from the CAN protocol controller;
 transmitting a message to a CAN protocol controller instructing it not to generate signalling for the CAN transceiver until the beginning of the ACK slot or until said indication that the bit rate used on the bus is below a threshold rate;
 disabling one or more transmitters of the CAN transceiver used to transmit signalling to the CAN bus.

In one or more embodiments, the identifier memory is configured to store one or both of:
 a) one or more identifiers; and
 b) an identifier mask that corresponds to a group of identifiers.

In one or more embodiments, the compare logic is further configured to output the match signal when both the comparison indicates that the received identifier of the CAN message matches the entry that is stored at the CAN device and the CAN device is not currently transmitting a CAN message with the received identifier.

In one or more embodiments, the compare module further includes a transmit data, TXD, input interface configured to receive data from a CAN protocol controller and wherein the compare logic is further configured to populate the identifier memory with an identifier of a CAN message received at the TXD input interface.

In one or more embodiments, the signal generator is further configured to provide for transmission of an error signal onto the CAN bus, said error signal being in an End of Frame field.

According to a second aspect of the disclosure, we disclose a method for controlling Controller Area Network, CAN, traffic, the method comprising:
receiving an identifier of a CAN message at a CAN device, the identifier received at the CAN device via a CAN bus;
comparing the identifier of the CAN message to an entry in an identifier memory at the CAN device;
outputting a match signal when the comparison indicates that the identifier from the CAN message matches the entry in the identifier memory; and
invalidating the CAN message, by generating a signal to invalidate the CAN message in response to the match signal, wherein the signal generated by the signal generator provides for at least one of: one or more bits at bit positions immediately following a FDF field is made dominant; and the FDF field is made dominant.

In one or more embodiments, said signal is configured to cause said CAN transceiver to provide signalling to the CAN bus that provides said one or more dominant bits that are timed so that at least the bit immediately following a FDF field or FDF field bit is made dominant.

In one or more embodiments, said signal to invalidate is provided to the CAN bus.

In one or more embodiments the method includes:
decoding the bit immediately following a FDF field of the CAN message;
determining whether or not the bit immediately following the FDF field is recessive
outputting a disable signal when the bit immediately following the FDF field is recessive; and
preventing transmission by the CAN transceiver to the CAN bus until a beginning of an ACK slot or until an indication that the bit rate used on the bus is below a threshold rate, in response to the disable signal.

In one or more embodiments, said CAN device is configured to prevent transmission by the CAN transceiver by one or more of:
blocking signalling from a CAN protocol controller from onward transmission to the CAN transceiver;
transmitting a message to a CAN protocol controller instructing it not to generate signalling for the CAN transceiver until the beginning of the ACK slot or until said indication that the bit rate used on the bus is below a threshold rate;
disabling one or more transmitters of the CAN transceiver used to transmit signalling to the CAN bus.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
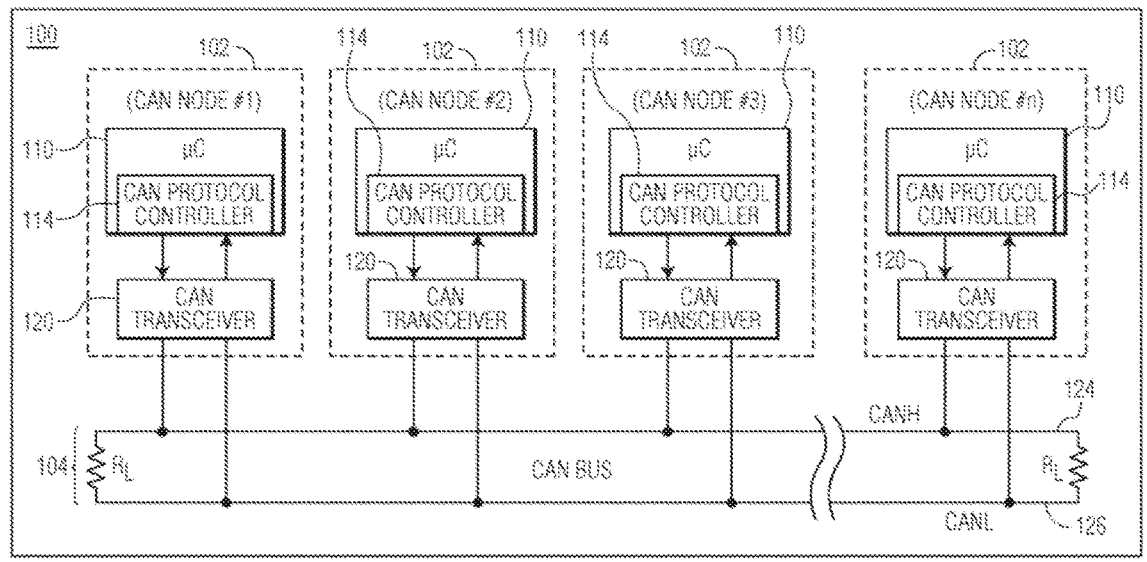
FIG. 1 depicts an example CAN network that includes multiple CAN nodes connected to a CAN bus.

FIG. 1 depicts a CAN network 100 that includes multiple CAN nodes 102, also referred to as "ECUs," each connected to a CAN bus 104. In the embodiment of FIG. 1, each CAN node includes a microcontroller 110 having an embedded CAN protocol controller 114 and a CAN transceiver 120. The microcontrollers are typically connected to at least one device (not shown) such as a sensor, an actuator, or some other control device and are programmed to determine the meaning of received messages and to generate appropriate outgoing messages. The microcontrollers, also referred to as host processors, hosts, or digital signal processors (DSPs), are known in the field. In an embodiment, the host supports application software that interacts with the CAN protocol controller.

The CAN protocol controllers 114, which can be embedded within the microcontrollers 110 or external to the microcontrollers (e.g., a separate IC device), implement data link layer operations as is known in the field. For example, in receive operations, a CAN protocol controller stores received serial bits from the transceiver until an entire message is available for fetching by the microcontroller. The CAN protocol controller can also decode the CAN messages according to the standardized frame format of the CAN protocol. In transmit operations, the CAN protocol controller receives messages from the microcontroller and transmits the messages as serial bits in the CAN frame format to the CAN transceiver.

The CAN transceivers 120 are located between the microcontrollers 110 and the CAN bus 104 and implement physical layer operations. For example, in receive operations, a CAN transceiver converts analog differential signals from the CAN bus to serial digital signals that the CAN protocol controller 114 can interpret. The CAN transceiver also protects the CAN protocol controller from extreme electrical conditions on the CAN bus, e.g., electrical surges. In transmit operations, the CAN transceiver converts serial digital bits received from the CAN protocol controller into analog differential signals that are sent on the CAN bus.

The CAN bus 104 carries analog differential signals and includes a CAN high (CANH) bus line 124 and a CAN low (CANL) bus line 126. The CAN bus is known in the field.

Figure 2:
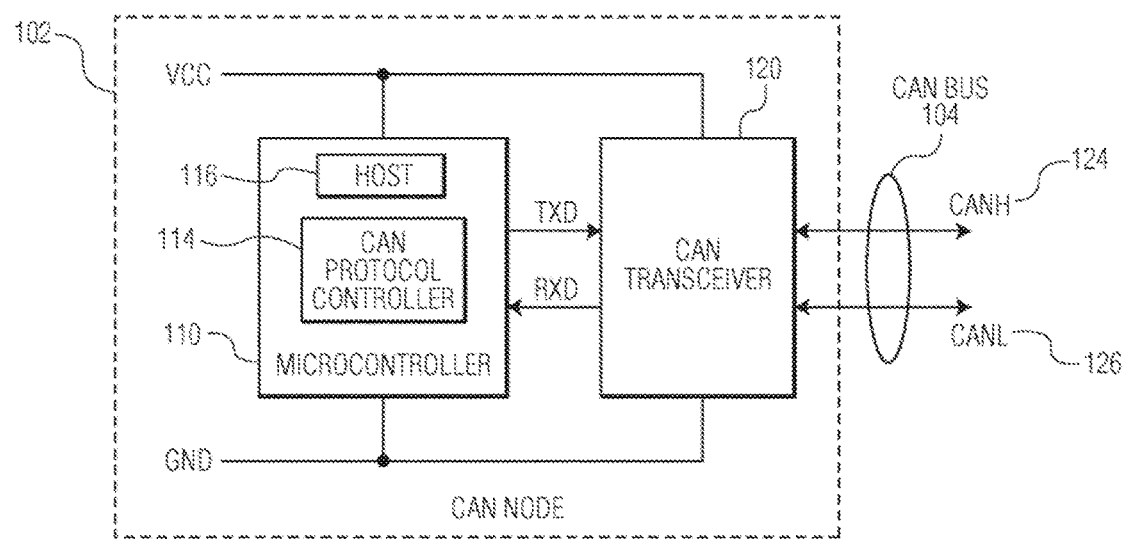
FIG. 2 depicts an expanded view of one CAN node from FIG. 1.

FIG. 2 depicts an expanded view of one CAN node 102 from FIG. 1. In the expanded view of FIG. 2, the microcontroller includes a host 116, which may be, for example, a software application that is stored in memory of the microcontroller and executed by processing circuits of the microcontroller. The microcontroller 110 and the CAN transceiver 120 of the CAN node are connected between a supply voltage, Vcc, and ground, GND. As illustrated in FIG. 2, data communicated from the microcontroller to the CAN transceiver is identified as transmit data (TXD) and data communicated from the CAN transceiver to the microcontroller is referred to as receive data (RXD). Throughout the description, TXD is carried on a TXD path and RXD is carried on an RXD path. Data is communicated to and from the CAN bus via the CANH and CANL bus lines 124 and 126, respectively.

As noted above, the CAN protocol controller 114 can be configured to support the normal mode or the flexible data rate mode. As used herein, "CAN normal mode" (also referred to as "Classical CAN mode") refers to frames that are formatted according to the ISO 11898-1 standard and "CAN FD mode" refers to frames that are formatted according to the ISO standard ISO11898-1:2015 (Protocol) and ISO 11898-2 (Transceiver), or an equivalent thereof.

Figure 3A:
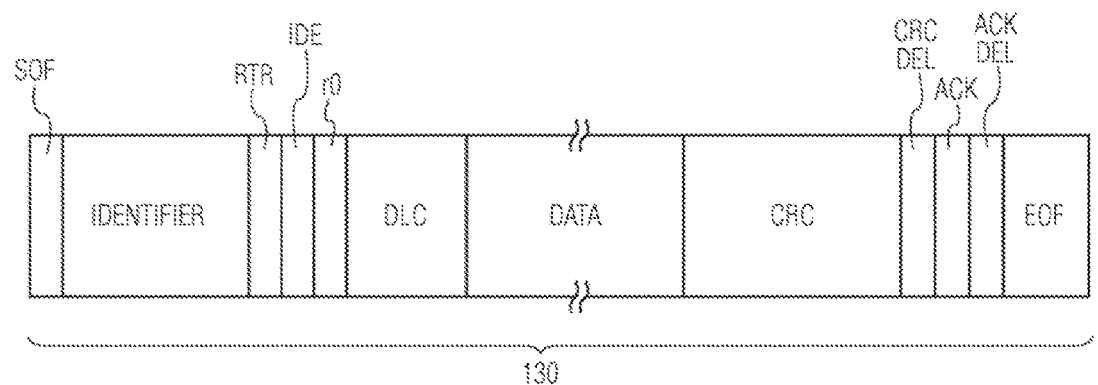
FIG. 3A depicts the format of an ISO 11898-1 frame that is used in CAN normal mode.
Figure 3B:
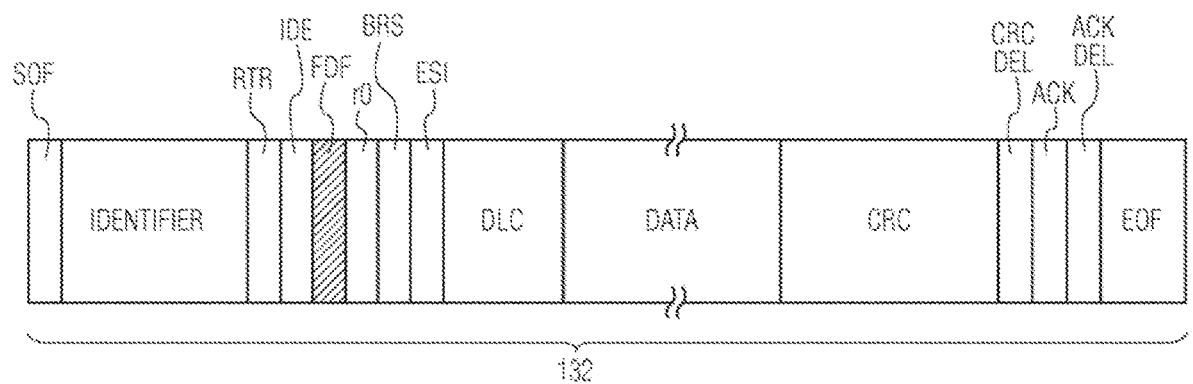
FIG. 3B depicts the format of an ISO 11898-1 frame that is used in CAN FD mode.

FIG. 3A depicts the format of an ISO 11898-1 frame 130 (in the classical base frame format (CBFF) or standard format) that is used in CAN normal mode and FIG. 3B depicts the format of an ISO/DIS 11898-1 frame 132 (in the FD base frame format or FBFF) that is used in CAN FD mode. The fields of the CAN normal mode and CAN FD mode frames are defined as follows:
SOF: Start of Frame (always dominant)
IDENTIFIER: Identifier Bits, defining the message content
RTR: Remote transmission Request
IDE: ID Extension r0: Reserved Bit 0 (replaced by FDF in the CAN FD format)
FDF: Flexible Data Rate Format (this is the bit distinguishing the frame formats)
BRS: Baud Rate Switch
ESI: Error State Indicator
DLC: Data Length Code
Data: Data Bytes
CRC: Cyclic Redundancy Check
CRC Del: CRC Delimiter (always recessive)
ACK: Acknowledge
ACK Del: Acknowledge Delimiter
EOF: End Of Frame There is also another version of the classical frame format, referred to as "classical extended frame format (CEFF)," in which the FDF bit is in the old r1 position, whereas the FDF bit is in the r0 position in CBFF. There is also a "FD extended frame format (FEFF)," where "extended" refers to a 29-bit identifier.

The CAN protocols use the reserved bit (r0 or r1) (also referred to generally as the FDF bit) within a CAN frame to identify a frame as a CAN FD mode frame. In particular, the FDF bit is a 1-bit field that indicates whether the frame is a CAN normal mode frame (ISO 11898-1) or a CAN FD mode frame (ISO11898-2:2015).

When the FDF bit is dominant (e.g., low or "0"), the frame is a CAN normal mode frame and when the FDF bit is recessive (e.g., high or "1"), the frame is a CAN FD mode frame. In a CAN normal mode frame, the reserved bits (r0, r1) are always driven dominant to the bus lines.

Figure 4A:
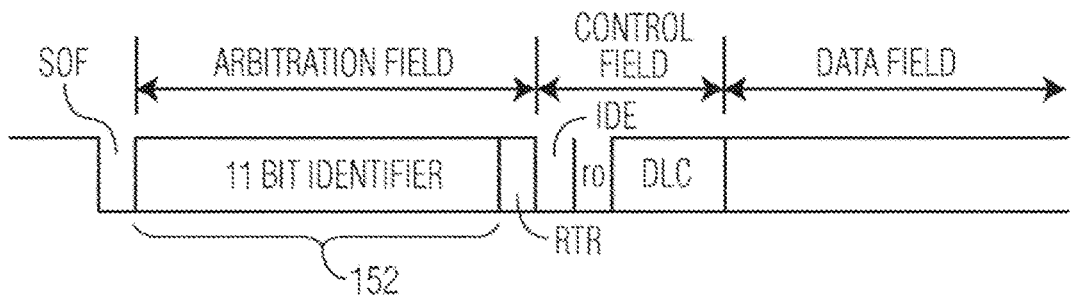
FIG. 4A depicts the IDENTIFIER field of a standard CAN frame.
Figure 4B:
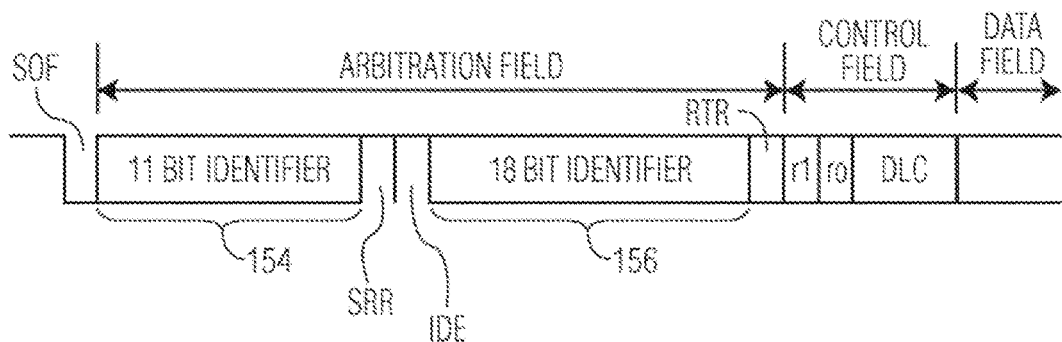
FIG. 4B depicts the IDENTIFIER field of an extended CAN frame.

CAN messages are broadcast messages and the identifier is unique to the sender CAN node. The CAN protocol controllers of the receiving CAN nodes have identifier filters that are "tuned" to certain identifiers to make sure that the host receives relevant messages and is not bothered with irrelevant messages. Standard CAN frames have an 11-bit IDENTIFIER field to carry an 11-bit identifier and extended CAN frames have a 29-bit IDENTIFIER field to carry a 29-bit identifier. The IDENTIFIER field 152 of a standard CAN frame is depicted in FIG. 4A and the IDENTIFIER field of an extended CAN frame is depicted in FIG. 4B. As shown in FIG. 4B, the 29-bit IDENTIFIER field is divided into two sections, an 11-bit base IDENTIFIER field 154 and an 18-bit extended IDENTIFIER field 156.

As stated above, security is a growing concern with in-vehicle networks. To detect and prevent such an attack on the CAN network, a CAN node can be configured to store the identifier of a CAN message that is being sent by the CAN node itself and further configured to compare the identifiers of incoming CAN messages to the stored identifier to determine if any incoming CAN messages have a matching identifier. Since identifiers are unique to each CAN node, if a received identifier matches a stored identifier, the receiving CAN node can assume that the CAN message is from an intruder and can take an action to prevent the intrusion. For example, in response to detecting a match between a received identifier and a stored identifier, the CAN node can be configured to immediately send an invalidation signal onto the CAN bus to prevent the malicious CAN message from being successfully and/or completely received by any CAN nodes on the CAN bus, e.g., to invalidate, destroy, and/or kill the CAN message. Applying such a technique, only the original CAN node that uses a particular identifier can send CAN messages with that identifier without the CAN messages being invalidated, destroyed, and/or killed.

Using the above-described technique, a CAN node only needs to store the identifier of the CAN messages that are sent from that particular CAN node. That is, a CAN node only needs to store one entry, e.g., the identifier of the last CAN message that was sent from the CAN node and disturbed by an attacker. In another embodiment, a CAN node can be configured to store multiple different identifiers that have been sent from the respective CAN node, for example, all of the different identifiers that have been sent from the particular CAN node over time. Any CAN message that is received at the CAN node with a matching identifier, assuming that the CAN node itself is not transmitting the CAN message, can be invalidated by the CAN node by, for example, transmitting an error signal such as an error flag onto the CAN bus. In an embodiment, memory sufficient to store up to thirty-two different identifiers provides a good balance between flexibility and hardware resource needs (e.g., die space requirement). In another embodiment, the identifier memory is populated with at least one mask that corresponds to a group of identifiers. For example, the identifier memory includes a mask register that allows each bit of the mask register to be set to a "1," a "0," or a "don't care." The mask register can include enough bits to cover an entire identifier or only a portion of an identifier. In an embodiment that utilizes mask registers in the identifier memory, the mask registers can be programmable. In operation, an identifier from an incoming CAN message is compared with the mask and if the identifier matches the mask, a match signal is output. In an embodiment, the CAN messages of concern are CAN "data frames" as these are the CAN messages that carry payload data (e.g., in the DATA field). As is known in the field and described in the CAN protocol, CAN "data frames" are CAN frames with the RTR bit set to "0." On the other hand, CAN "remote frames" may not be of concern and may not be included in the identifier memory or checked for a match because CAN remote frames do not carry a payload (e.g., they do not include a DATA field). As is known in the field and described in the CAN protocol, CAN "remote frames" are CAN frames with the RTR bit set to "1."

Figure 5:
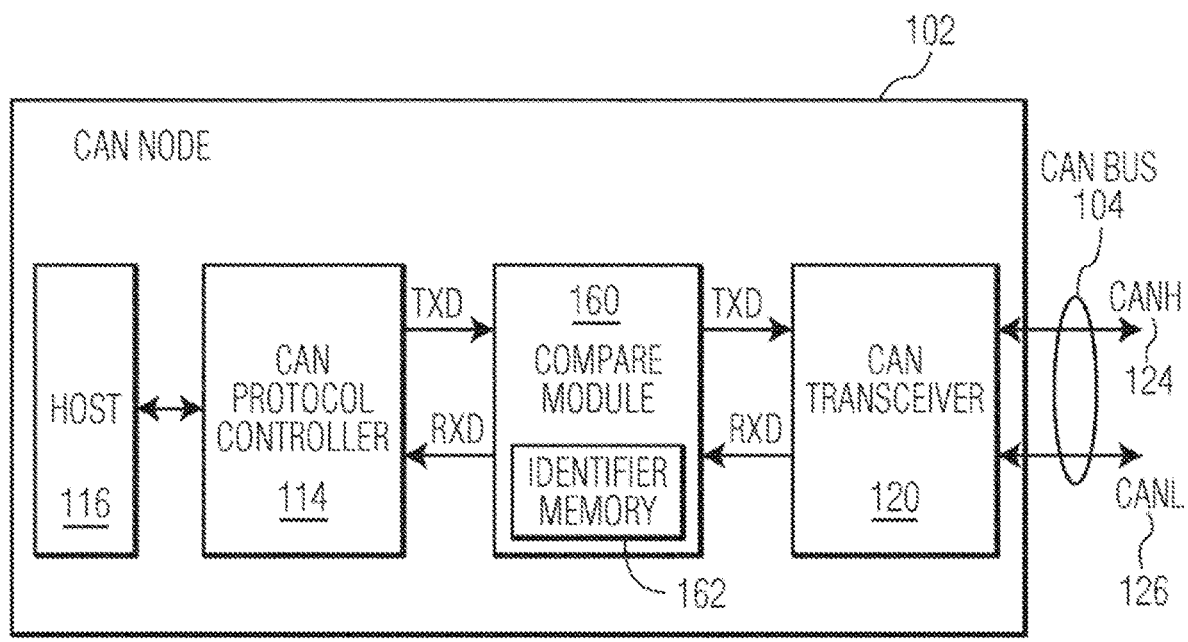
FIG. 5 depicts an embodiment of a CAN node that is configured to implement an intrusion detection/prevention technique.

FIG. 5 depicts an example CAN node 102. The CAN node includes a CAN transceiver 120, a CAN protocol controller 114, and a host 116 as described above with reference to FIG. 1. In examples of the disclosure a compare module 160 is provided. The compare module may be part of the CAN transceiver 120. However, in example FIG. 5, it is shows as a separate block between the CAN transceiver 120 and the CAN protocol controller 114.

With reference to FIG. 5, the compare module 160 may be located in a data path between the CAN transceiver and the CAN protocol controller. The compare module includes an identifier memory 162 and is configured to decode an identifier of a CAN message that is received on the CAN bus 104 (e.g., CAN messages on the RXD path) and to compare the identifier of the CAN message to an entry (e.g., an identifier or a mask) that is stored in the identifier memory. As shown in FIG. 5, the compare module is located before the CAN protocol controller such that the comparison can take place before the CAN message is completely received at the CAN protocol controller and before any corresponding message is provided to the host. If the comparison indicates that the identifier from the CAN message matches the stored entry (e.g., the identifier or the mask) and assuming the CAN node is not transmitting the CAN message itself, a match signal is output from the compare module. In an embodiment, the match signal triggers the CAN device to invalidate, destroy, and/or kill the incoming CAN message before the corresponding message is provided to the host to prevent the CAN message from implementing any malicious activity within the CAN node itself and/or within other CAN nodes in the CAN network.

In an embodiment, the compare module 160 decodes outgoing CAN messages (e.g., CAN messages on the TXD path) and populates the identifier memory with the decoded identifiers. For example, the compare module adds to the identifier memory each identifier that has been successfully transmitted onto the CAN bus and that is not already stored in the identifier memory. In an embodiment, identifiers received on the TXD path are only stored in the identifier memory when the CAN protocol controller has not lost arbitration, e.g., the CAN protocol controller is still in transmit mode after the arbitration field. This is so because when the CAN protocol controller loses arbitration, subsequent bits of the identifier on the TXD path are all set to "1". In an embodiment, the compare module could be disconnected from the TXD path to exclude arbitration effects. In another embodiment, the compare logic is configured to confirm that the identifier received on the TXD path is the same as the identifier received on RXD path, e.g., an indication that arbitration was not lost.

Figure 6:
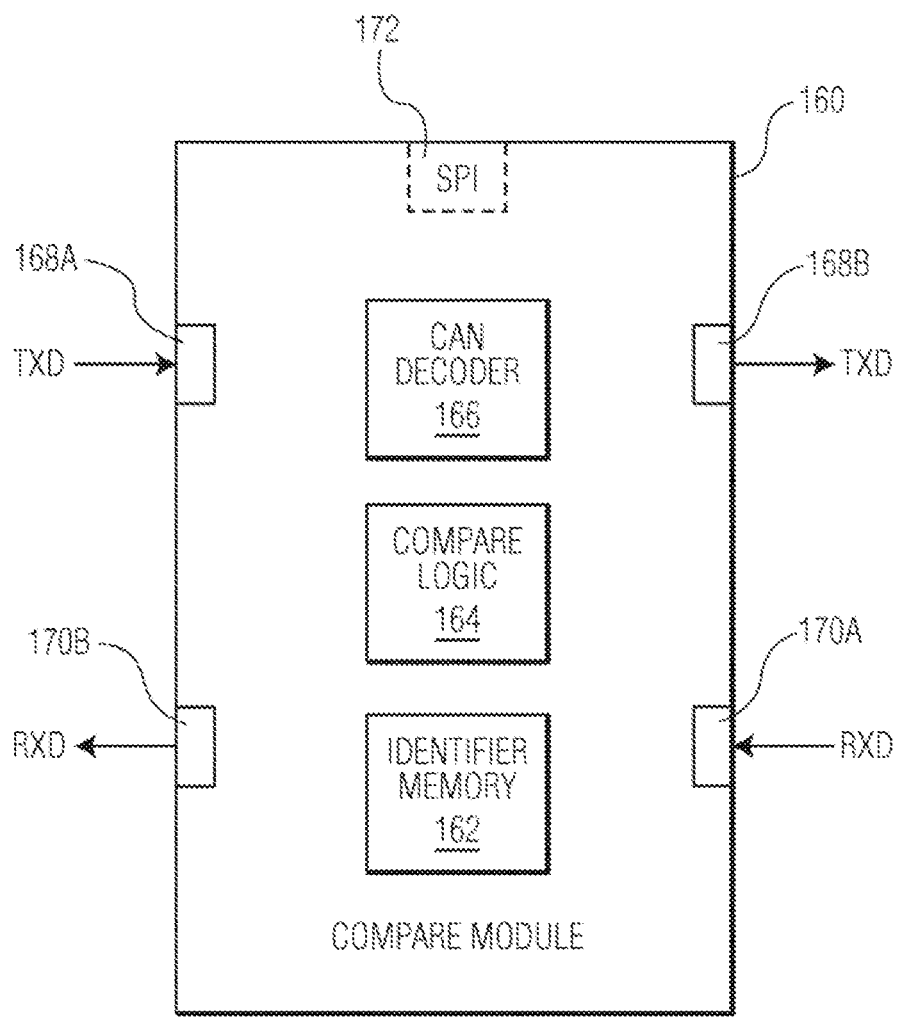
FIG. 6 depicts an embodiment of the compare module of FIG. 5.

FIG. 6 depicts an embodiment of the compare module 160 of FIG. 5. The compare module of FIG. 6 includes an identifier memory 162, compare logic 164, a CAN decoder 166, a TXD input interface 168A, a TXD output interface 1688, an RXD input interface 170A, and an RXD output interface 170B. The RXD input interface is configured to receive data from the RXD path and the TXD input interface is configured to receive data from the TXD path. The identifier memory may be configured to store an entry as an identifier in a manner that allows the identifier to be quickly searched. Multiple identifiers may also be stored in the identifier memory. The identifier memory may be configured to store an entry as a mask that allows a group of identifiers to be matched. Multiple masks may also be stored in the identifier memory. In an embodiment, the identifier memory is a content addressable memory (CAM) as is known in the field although other memory types are possible. In an embodiment, the identifier memory is write protected and is written to only one time, e.g., by the vehicle manufacturer. In one embodiment, the identifier memory is sized to store a single identifier and in other embodiments, the identifier memory is sized to store multiple identifiers, for example, up to thirty-two identifiers.

The CAN decoder 166 is configured to decode serial data (e.g., RXD and TXD) according to the CAN protocol and to parse out the identifier of a CAN message. The CAN decoder may comprise a CAN decoder having the capability to decode the proposed CAN XL message format and, optionally, the capability to decode the CAN FD message format. It will be appreciated that the compare module is configured to perform a particular task of reading the identifier and outputting a match signal as described herein. Accordingly, the CAN decoder 166 of the compare module may or may not be configured to decode all of a received message. Thus, the CAN decoder 166 may, in some examples, comprise a rudimentary CAN decoder 166 comprising a CAN decoder 166 comprising functionality to extract the identifier field and may lack functionality to extract, read or process other parts of the message. The compare logic is configured to compare a received identifier from a CAN message with the stored identifier (or identifiers) in the identifier memory and to output a "match" signal when the comparison indicates that the received identifier of the CAN message matches the stored identifier. In an embodiment, the match signal triggers the CAN node to invalidate, destroy, and/or kill the CAN message before the CAN message is completely and successfully received at the CAN protocol controller.

In CAN XL the bit time may be "fast" or "slow" wherein the fast bits (shorter bit time) may comprise the higher data rate bits provided by CAN XL and the slow bits (greater bit time) may comprise the bits provided for compatibility with CAN and CAN FD. Therefore the interfaces may provide for "fast" and "slow" communication. One or more components of the CAN transceiver, CAN device or CAN protocol controller may be configured to provide an indication of whether or not the fast or slow bit rate is being used at any one time. The interfaces may not be only one bit wide, as in CAN and CAN FD.

In one example embodiment, the CAN device is configured to invalidate a suspicious CAN message on the CAN bus by sending an error signal such as an error flag onto the CAN bus. Sending an error signal such as an error flag onto the CAN bus will cause the suspicious CAN message to be processed incorrectly, thereby invalidating the suspicious CAN message.

In an embodiment, a CAN message may be invalidated with an error flag comprising the transmission, by the CAN node 102, of a dominant bit immediately following the FDF field of the CAN message. In FIG. 3B, the bit immediately following the FDF field is designated r0 and is also known as RES in the CAN FD frame format. Thus, in one or more examples, following a recessive bit in the FDF field, the CAN message is invalidated by sending a dominant bit in the bit position after the recessive FDF bit, that is in the RES position in the frame.

In the proposed CAN XL specification, which provides an extension of the CAN and CAN FD specifications, the RES field of a CAN FD frame (comprising a bit in a CAN FD frame) is proposed to be used to distinguish between CAN FD Frames and CAN XL Frames. In CAN XL, the RES field is further known as the XLF field.

The RES field (bit) is dominant in CAN FD frames and it is recessive in CAN XL frames. A node transmitting a CAN XL Frame shall lose arbitration when it samples a dominant RES bit and shall become a receiver of a CAN FD Frame.

Accordingly, a CAN message, which may comprise a CAN message in accordance with the proposed CAN XL specification, may be invalidated by transmitting a dominant bit in the bit position immediately following the FDF bit, that is in the RES bit position (labelled r0 in example FIG. 3B), which has the effect of preventing the other CAN nodes coupled to the bus from recognizing the CAN message as a CAN XL message. In other examples, a plurality of dominant bits may be transmitted.

Thus, for a CAN XL message, the FDF field comprise a recessive bit and the RES field (as named in CAN FD) or XLF field (same bit position but as named in CAN XL) comprises a recessive bit. When such a message is identified as invalid or rogue, the invalidation is achieved by the CAN device providing for the transmission of a dominant bit to "overwrite" the recessive bit in the bit position immediately following the FDF field or, put another way, overwrite the recessive XLF bit.

In one or more examples, a CAN message may be invalidated with an error flag comprising the transmission, by the CAN node 102, of a dominant bit in the RES bit position shown as r0 in FIG. 3A. This would have the effect of causing the other nodes to believe the CAN XL message is a standard CAN message.

Accordingly, the CAN protocol controllers 114 of the other CAN nodes do not switch their frame format decoding from CAN or CAN FD to the proposed CAN XL frame format. With the frame format decoding being performed in accordance with the CAN or CAN FD specification, a rogue or invalid CAN XL frame will not be decoded correctly and is therefore, in effect, invalidated. Thus, the CAN protocol controllers 114 of all other nodes coupled to the bus 104 are configured, on receipt of a dominant bit in the bit position that immediately follows the FDF bit, decode the received CAN message as a CAN FD message. Accordingly, when said CAN message is actually a CAN XL message but the "XLF" bit that immediately follows the FDF field bit has been changed by the action of one of the CAN nodes 120, it will not be decoded correctly or cause an error to be generated in the CAN protocol controller 114 of the other CAN nodes 120 and therefore its DATA portion will not be decoded correctly. Similarly, if a recessive r0 bit as shown in FIG. 3A is made dominant by the action of the CAN device, the CAN protocol controllers 114 of all other nodes coupled to the bus 104 are configured, on receipt of a dominant bit in the FDF bit position, decode the received CAN message as a CAN message.

This may be advantageous because it provides a means for a CAN node 102 to receive a CAN message from the bus and, by way of its identifier, recognises it as a suspicious CAN message and should that CAN message be a CAN XL message or include information to designate a transition to the use of CAN XL on the CAN bus, prevent, at least in part (that is a CAN XL part of the CAN message), its decoding by other CAN nodes by transmitting a dominant bit to coincide with the RES or "XLF field" bit of that CAN message on the CAN bus.

The means for making the reserved bit, comprising the recessive bit that immediately follows the FDF bit dominant (or FDF bit) in response to the match signal may be achieved in different ways. For example, the functionality described may be part of the CAN transceiver and therefore the signalling may be provided by control of a transmitter of the CAN transceiver. In one or more other examples, a different transmitter to that present in the CAN transceiver may be provided for making the bit that immediately follows the FDF bit dominant. Other examples will be described below.

It will be appreciated that an additional invalidation technique, in accordance with the CAN FD specification may, in some examples, also be employed. The additional invalidation technique may comprise sending a further error signal as a single dominant bit in the EOF field would be sufficient to invalidate a CAN message on the CAN bus. Invalidating a CAN message in the EOF field can be beneficial because the CRC has been processed and thus it can be assured that the wrong CAN message (with a corresponding identifier) has not been invalidated, e.g., due to a receive error in the identifier field. Invalidating a CAN message with a few bits, e.g., less than 6 bits which would make an error flag, might also be beneficial.

In an example embodiment, the compare logic 164 of the compare module 160 is also configured to determine if the CAN node itself is transmitting a CAN message with the received identifier. For example, the compare logic may monitor the TXD input interface 168A or monitor a transmission status signal from the protocol controller 114. If the CAN node is actively transmitting a CAN message, then it is expected that the CAN transceiver 120 will also receive the same CAN message and the CAN decoder 166 of the compare module will receive the same identifier. Therefore, in an embodiment, the compare logic is configured to output a match signal only when there is a match between the received identifier and a stored identifier and when the CAN node is not actively transmitting a CAN message.

In an embodiment, the identifiers stored in the identifier memory are restricted to those identifiers that are supposed to be transmitted from the CAN device. In another embodiment, the identifiers stored in the identifier memory are restricted to those identifiers that actually have already been successfully transmitted on the CAN bus. In an embodiment, the identifier memory is automatically populated with those identifiers that have been successfully transmitted on the CAN bus.

In another embodiment, the identifier memory 162 of the compare module 160 may be populated directly from the host 116. For example, the compare module may include an alternate interface 172 (see FIG. 6), such as an SPI interface, that is used to receive identifiers directly from the host to populate the identifier memory. If the alternate interface is used to populate the identifier memory, the TXD input and TXD output interfaces on the compare module may not be needed. Additionally, although the compare module of FIG. 6 includes both an RXD input interface and an RXD output interface, the RXD output interface may not be needed depending on the implementation, e.g., how the compare module is connected to the RXD path. Likewise, although the compare module of FIG. 6 includes both a TXD input interface and a TXD output interface, the TXD output interface may not be needed depending on the implementation, e.g., how the compare module is connected to the TXD path. For example, as shown in the embodiment of FIG. 7, the RXD path and TXD path are spliced into the compare module via the RXD input interface and the TXD input interface, respectively.

Figure 7:
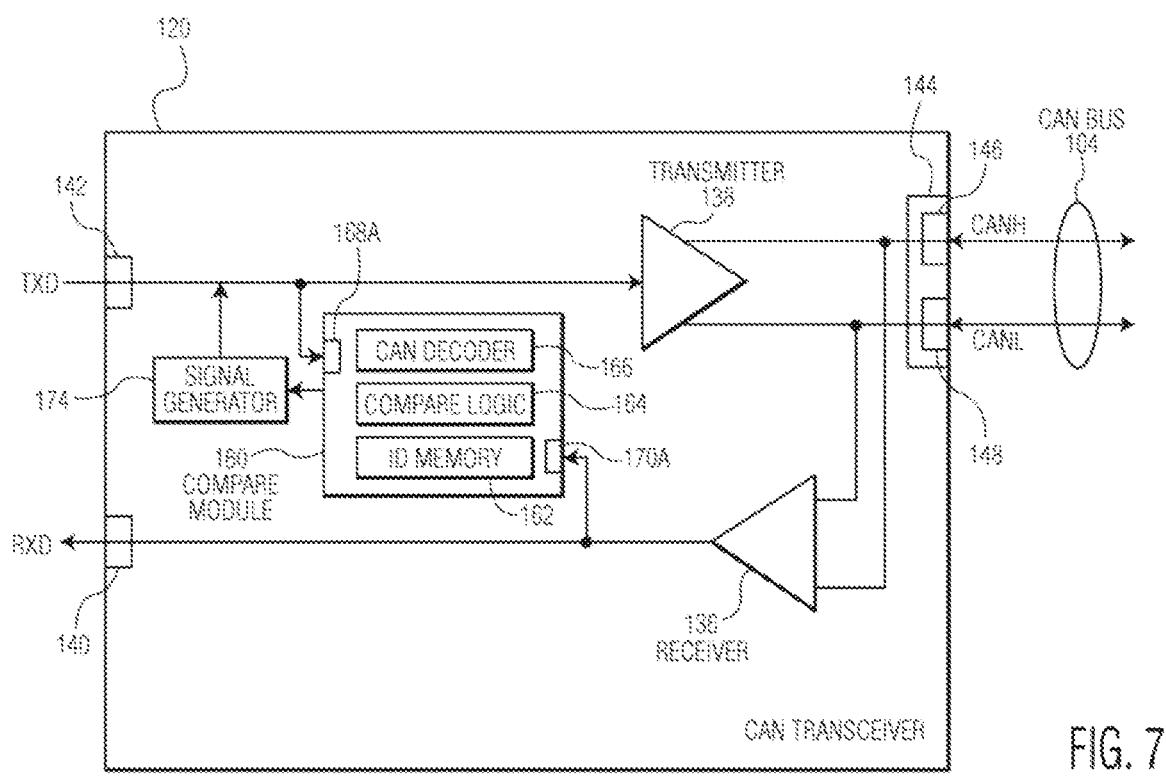
FIG. 7 depicts an embodiment of a compare module integrated into a CAN transceiver.

FIG. 7 depicts an embodiment of how a compare module, such as the compare module 160 described with reference to FIGS. 5 and 6, can be integrated into a CAN transceiver 120. The CAN transceiver 120 includes a receiver 136, a transmitter 138, an RXD interface 140, a TXD interface 142, and a CAN bus interface 144 having a CANH bus interface 146 and a CANL bus interface 148. Incoming CAN traffic (e.g., RXD) that is received at the CAN bus interface is passed to the RXD interface 140 via the receiver and outgoing CAN traffic (e.g., TXD) that is received at the TXD interface 142 is transmitted out the CAN bus interface via the transmitter. As shown in FIG. 7, the RXD input interface 170A of the compare module is connected to the RXD path and the TXD input interface 168A of the compare module is connected to the TXD path. In the embodiment of FIG. 7, the CAN transceiver also includes a signal generator 174 that is configured to generate a signal, such as the error flag described above, for transmission on the CAN bus 104. In an embodiment, the CAN transceiver is a discrete stand alone integrated circuit (IC) device that can be connected to a microcontroller IC device on a printed circuit board (PCB).

In operation, the identifier memory 162 is populated via the TXD path and identifiers on the RXD path from received CAN messages are decoded by the CAN decoder 166 and checked by the compare logic 164. If a match signal is generated in response to a comparison of an identifier to a stored identifier by the compare logic, the match signal is provided to the signal generator 174, which is configured to generate an error flag to invalidate, destroy, and/or kill the incoming CAN message. Although not shown in FIGS. 6 and 7, in some embodiments, the signal generator is part of the compare module and in other embodiments the signal generator is separate from the compare module. In an embodiment, hardware circuits to implement the compare module and the signal generator are fabricated on the same substrate as the circuits to implement the CAN transceiver and these circuits are packaged into a single IC device to provide a single chip security solution.

In one or more examples, the signal generated by the signal generator 174 is configured to cause said CAN transceiver 120 or the transmitter 138 thereof to provide signalling to the CAN bus that provides said one or more dominant bits that are timed so that at least a bit position directly after the FDF bit of the CAN message is made dominant. Accordingly, the signal generator may act to "instruct" the CAN transceiver.

In one or more examples, said signal generator is configured to provide signalling to the CAN bus that provides said one or more dominant bits that are timed so that at least the bit position directly after the FDF bit of the CAN message is made dominant (changed from recessive to dominant). Accordingly, the signal generator may have a connection to the CAN bus to apply signalling directly, such as without the use of one or more transmitters 138 of the CAN transceiver that transmits the CAN messages from the node.

Figure 8:
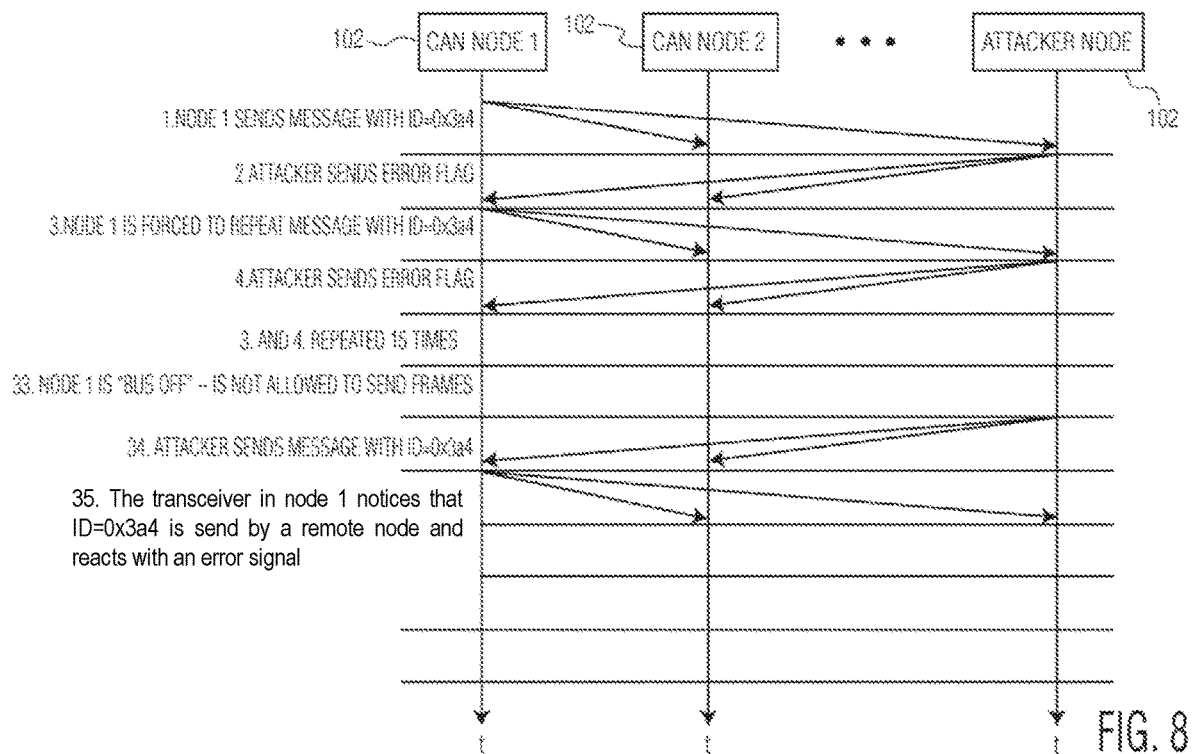
FIG. 8 is a signal timeline of message and signal traffic between CAN nodes and an attacker node that illustrates a first intrusion detection/prevention scenario.
Figure 9:
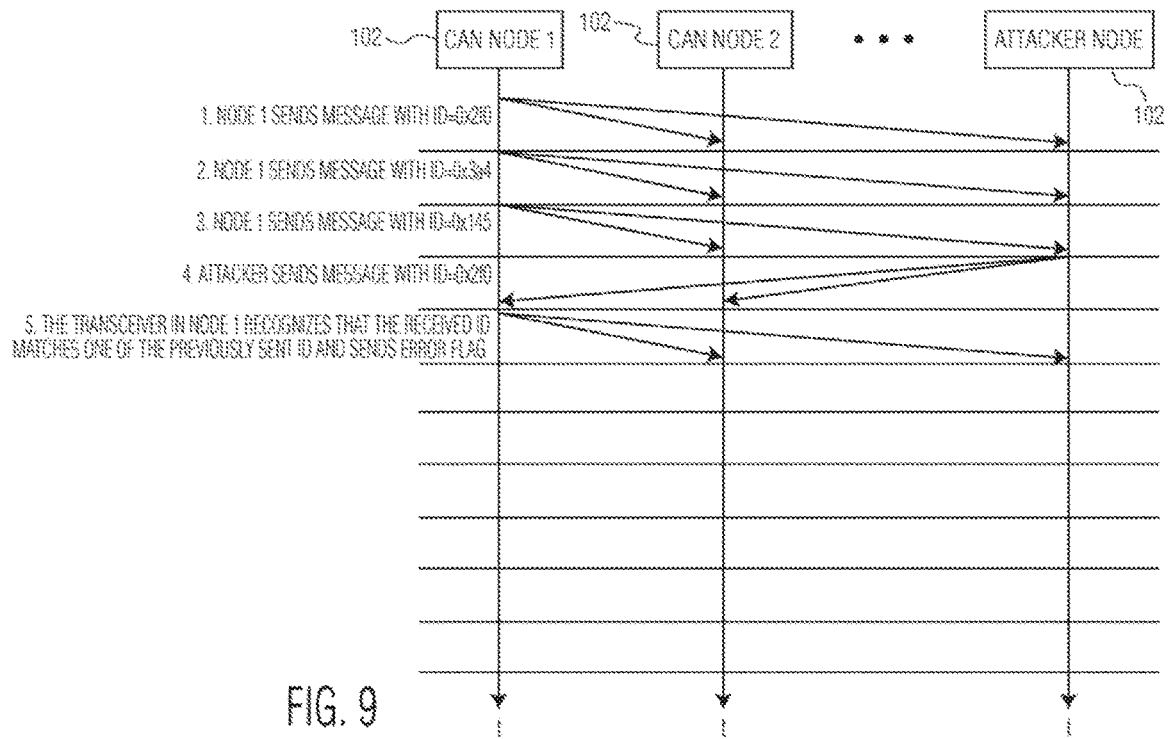
FIG. 9 is a signal timeline of message and signal traffic between CAN nodes and an attacker node that illustrates a second intrusion detection/prevention scenario.

As described above, including a compare module in a CAN node enables the CAN node to implement intrusion detection/protection. Two scenarios for implementing intrusion detection/protection using a compare module are described below with reference to FIGS. 8 and 9. FIGS. 8 and 9 show a CAN XL exchange in which error management is active. A different process may apply with error management turned off. FIG. 8 is a signal timeline of message and signal traffic between CAN nodes 102 (CAN nodes 1 and 2 and an attacker node) that illustrates a first intrusion detection/prevention scenario. In the example of FIG. 8, CAN node 1 is configured with a compare module (not shown) that stores only a single identifier. At time 1, CAN node 1 sends a CAN message with ID=0x3a4 onto the CAN bus and the identifier is stored in the identifier memory. At time 2, the attacker node sends an error flag. At time 3, CAN node 1 is forced to send another CAN message with ID=0x3a4 (because of the error flag at time 2) and at time 4 the attacker node sends another error flag. As dictated by the CAN protocol, the operations at times 3 and 4 are repeated fifteen more times at times 5-32. At time 33, CAN node 1 goes into a "error passive" state and after thirty two repetitions "bus off" state, in which the CAN node is no longer allowed to send CAN messages as specified by the CAN protocol. At time 34, the attacker node sends a CAN message with ID=0x3a4 to try to infiltrate the CAN network. However, at time 35, CAN node 1, which is equipped with a compare module as described above, produces a match signal when the identifier of the received CAN message matches a stored identifier and the CAN node takes an action to invalidate, destroy, and/or kill the CAN message. For example, in response to the match signal, CAN node 1 generates an error flag (e.g., via a signal generator 174 such as that shown in FIG. 7) and transmits the error flag onto the CAN bus. The error flag prevents the CAN XL message being decoded by the other CAN nodes, as described above.

FIG. 9 is a signal timeline of message and signal traffic between CAN nodes (CAN nodes 1 and 2 and an attacker node) that illustrates a second intrusion detection/prevention scenario. In the example of FIG. 9, CAN node 1 is configured with a compare module (not shown) that stores multiple identifiers. At time 1, CAN node 1 sends a CAN message with ID=0x2f0 onto the CAN bus, at time 2, CAN node 1 sends a CAN message with ID=0x3a4 onto the CAN bus, and at time 3, CAN node 1 sends a CAN message with ID=0x145 onto the CAN bus. In an embodiment, each time a CAN message is sent onto the CAN bus, the identifier of the CAN message is decoded by the compare module of the sending CAN node and the new identifier is added to the identifier memory. In the example of FIG. 9, the identifier module is populated with three different identifiers (e.g., identifiers 0x2f0, 0x3a4, and 0x145). At time 4, the attacker node sends a CAN message with ID=0x2f0 to try to infiltrate the CAN network. However at time 5, CAN node 1, which is equipped with a compare module as described above, produces a match signal when the identifier of the received CAN message matches a stored identifier and the CAN node takes action to invalidate, destroy, and/or kill the CAN message on the CAN bus. For example, in response to the match signal, CAN node 1 generates an error flag (e.g., via a signal generator 174 such as that shown in FIG. 7) and transmits the error flag onto the CAN bus. The error flag prevents the CAN XL message being decoded by the other CAN nodes, as described above.

Figure 10:
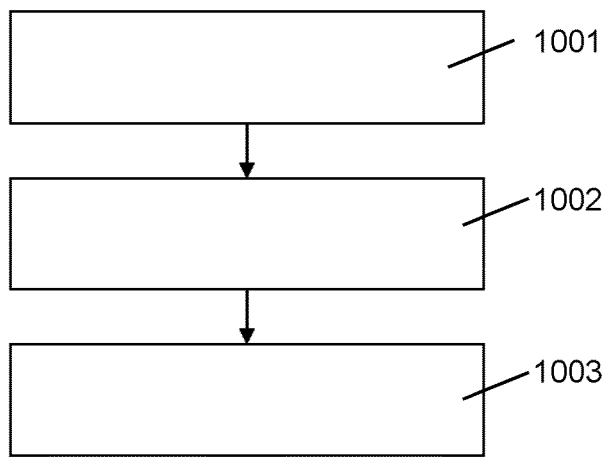
FIG. 10 shows an example flowchart illustrating the effect of the CAN device implementing the techniques described herein.

FIG. 10 shows an example flowchart summarizing the effect of the actions of the CAN device. Step 1001 represents a suspicious CAN XL message being transmitted on the CAN bus by an attacker. The FDF field is recessive. Further, the field immediately following the FDF field (the so called XLF field) is also recessive to designate the message as a CAN XL message. Step 1002 represents the CAN device receiving the message from the CAN bus and, once the identifier part of the message is received, identifying the message as suspicious by virtue of the matching identifier. The CAN device, as described above, is then configured to provide for transmission of one or more dominant bits timed so that the same CAN message has its recessive XLF field (that is the field directly following the FDF field) made dominant. Accordingly, the CAN node has caused the CAN message sent by the attacker to be seen by the other nodes as a non-CANXL message. Step 1003 represents the receipt by the other CAN nodes of the CAN message (which in practice happens substantially in parallel with the CAN device) with the changed XLF bit. This has the effect of invalidating the CAN XL message because the other nodes will not recognise it as a CAN XL message and therefore they will not receive it correctly.

As described above with reference to FIGS. 1 and 2, CAN nodes typically include a CAN transceiver, a CAN protocol controller, and a host. Often times the CAN transceiver is embodied as a separate IC device, the CAN protocol controller and host are embodied as a separate microcontroller IC device, and the transceiver IC and the microcontroller are connected to each other by a printed circuit board to form the CAN node. Although one possible level of integration is described, the above-described intrusion detection/prevention technique can be implemented in various different ways. For example, the compare module and signal generator can be integrated with the CAN transceiver, the CAN protocol controller, and the host in different combinations.

Figure 11:
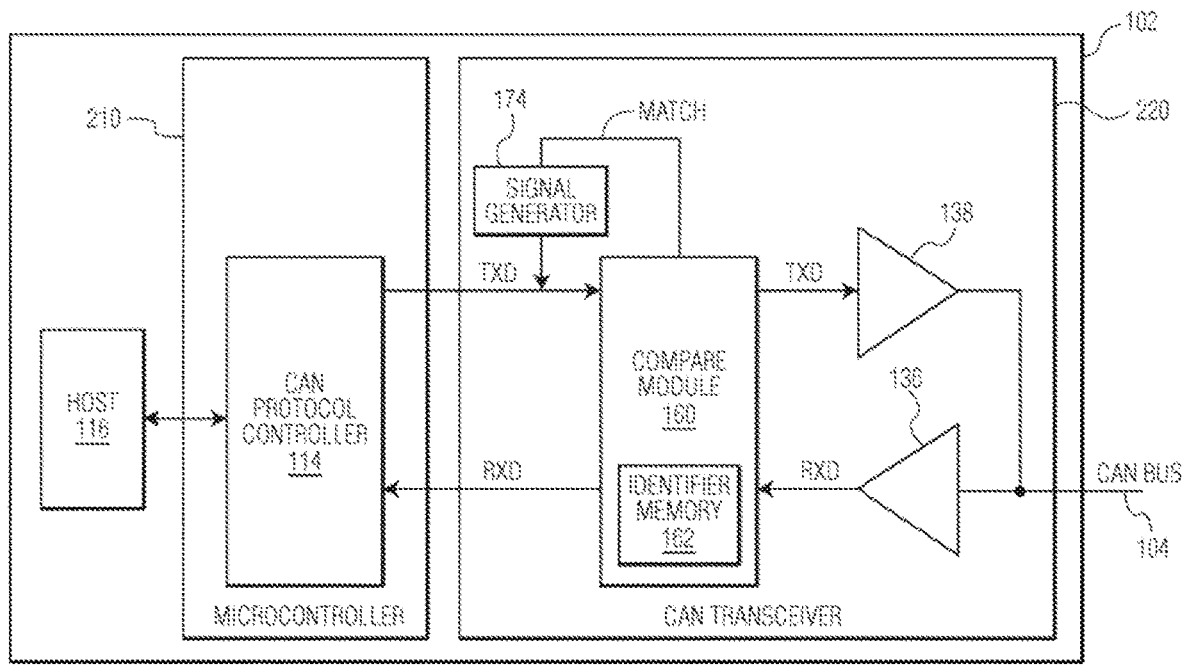
FIG. 11 depicts an embodiment of a CAN node that includes a compare module and a signal generator integrated into a microcontroller IC device.

FIG. 11 depicts an embodiment of a CAN node 102 that includes a CAN transceiver IC device 220, a microcontroller IC device 210, and a separate host 116. In this embodiment, the compare module 160 and signal generator 174 are integrated into the CAN transceiver IC device. As illustrated in FIG. 11, the match signal is used to control the signal generator to generate an error flag on the TXD path. Thus, the above-described intrusion detection/protection technique can be implemented entirely within the CAN transceiver IC device, thereby providing a security solution with a single CAN transceiver IC device or "chip."

Figure 12:
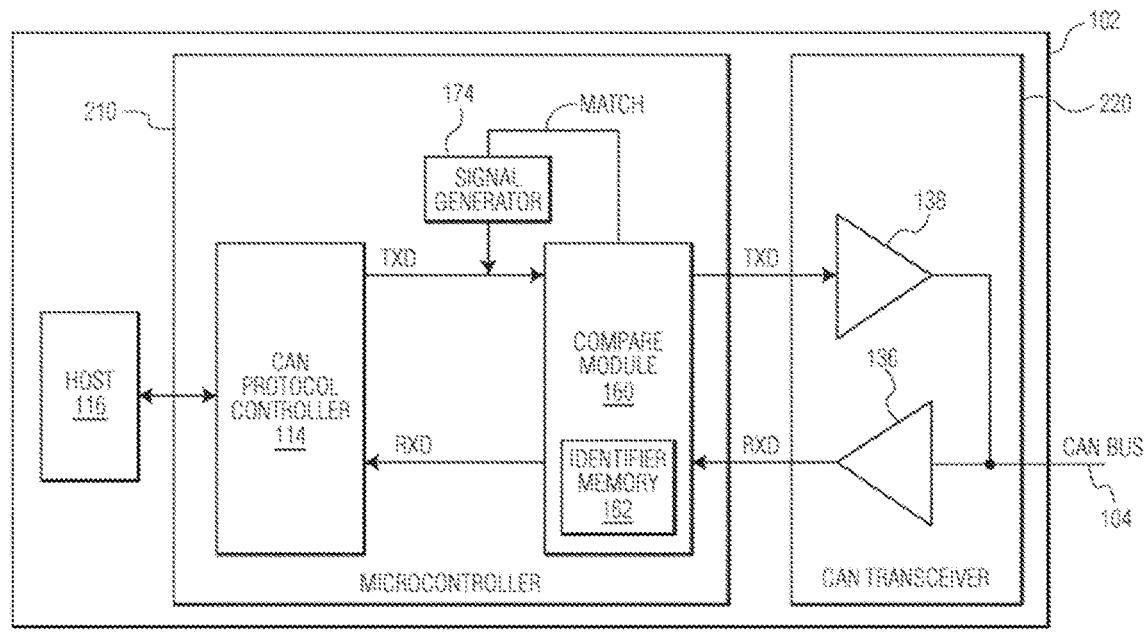
FIG. 12 depicts an embodiment of a CAN node that includes a compare module and a signal generator integrated into a microcontroller IC device.

FIG. 12 depicts an embodiment of a CAN node 102 that includes a CAN transceiver IC device 220, a microcontroller IC device 210, and a separate host 116. The compare module 160 and signal generator 174 are integrated into the microcontroller IC device. As illustrated in FIG. 12, the match signal is used to control the signal generator to generate an error flag on the TXD path. Thus, the above-described intrusion detection/prevention technique can be implemented entirely within the microcontroller IC device, thereby providing a security solution with a single microcontroller IC device or "chip."

Figure 13:
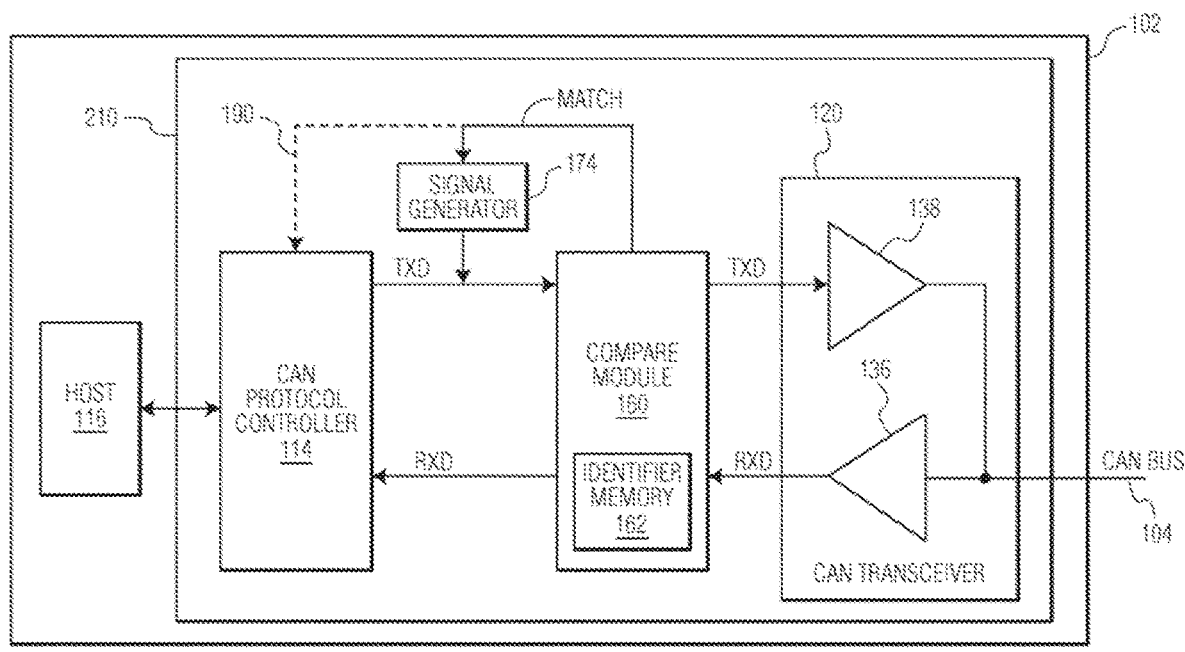
FIG. 13 depicts an embodiment of a CAN node in which a CAN transceiver, a CAN protocol controller, a compare module, and a signal generator are integrated into a single IC device.

FIG. 13 depicts an embodiment of a CAN node 102 in which the CAN transceiver 120 and the CAN protocol controller 114 are included on a single microcontroller IC device 210. In this embodiment, the compare module 160 and signal generator 174 are also integrated into the same IC device. As illustrated in FIG. 13, the match signal is used to control the signal generator to generate an error flag on the TXD path. Thus, the above-described intrusion detection/protection technique can be implemented entirely within a single microcontroller IC device, thereby providing a security solution with a single IC device or "chip." In an alternative embodiment as indicated by the dashed line 190, the match signal could be provided to the CAN protocol controller to trigger operations within the protocol controller. In one embodiment, the match signal triggers the protocol controller to generate an error flag and output the error flag onto the TXD path, in which case a separate signal generator is not needed. In another embodiment, the match signal still triggers the signal generator to generate the error flag, but additionally the match signal is provided to the CAN protocol controller so that the protocol controller can locally invalidate the incoming suspicious CAN message before the message is passed to the host. In another alternative embodiment, there is no extra signal generator and the match signal is provided to the CAN protocol controller, which generates an error flag in response to the match signal.

Figure 14:
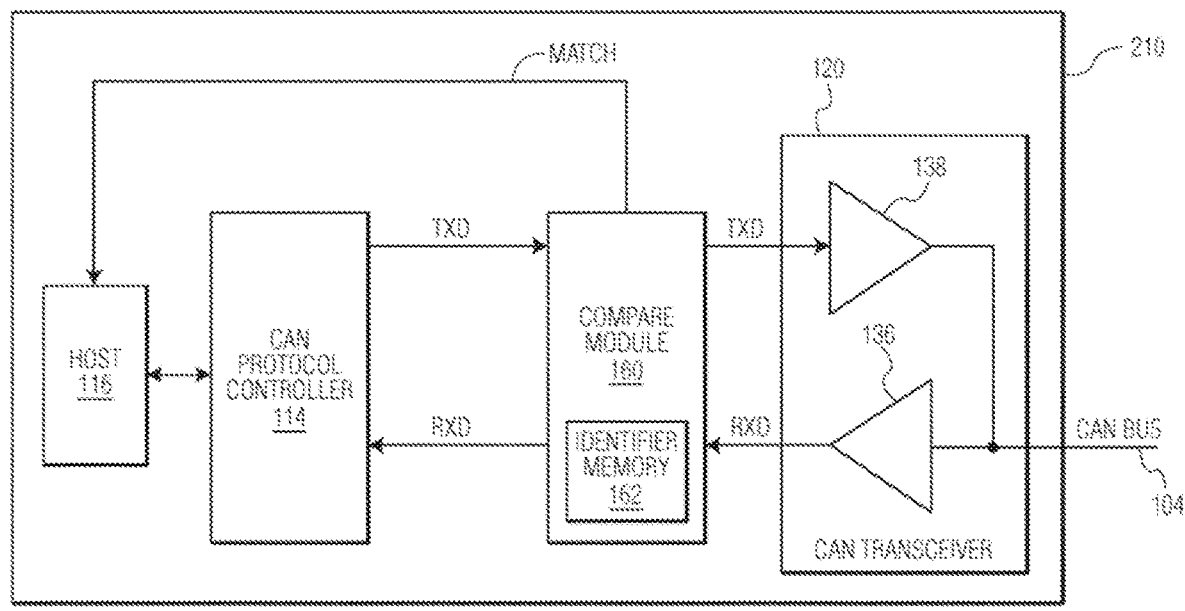
FIG. 14 depicts an embodiment of a CAN node in which a CAN transceiver, a CAN protocol controller, a host, and a compare module are integrated into a single IC device.

FIG. 14 depicts an embodiment of a CAN node in which the CAN transceiver 120, the CAN protocol controller 114, and the host 116 are included on a single microcontroller IC device 210, which microcontroller IC device constitutes a CAN node. In this embodiment, the compare module 160 is also integrated into the same microcontroller IC device. As illustrated in FIG. 14, the match signal is sent to the host, which can then use the match signal to implement a desired action. For example, the host can signal the CAN protocol controller to generate an error flag that is output onto the CAN bus and to invalidate the incoming suspicious CAN message. Thus, the above-described intrusion detection/protection technique can be implemented entirely within a single IC device or "chip." In an alternative embodiment, the match signal could also be provided to the CAN protocol controller and/or to a signal generator (not shown) as described with reference to FIGS. 7 and 11-13. Although some example configurations are shown, other configurations are possible.

Figure 15:
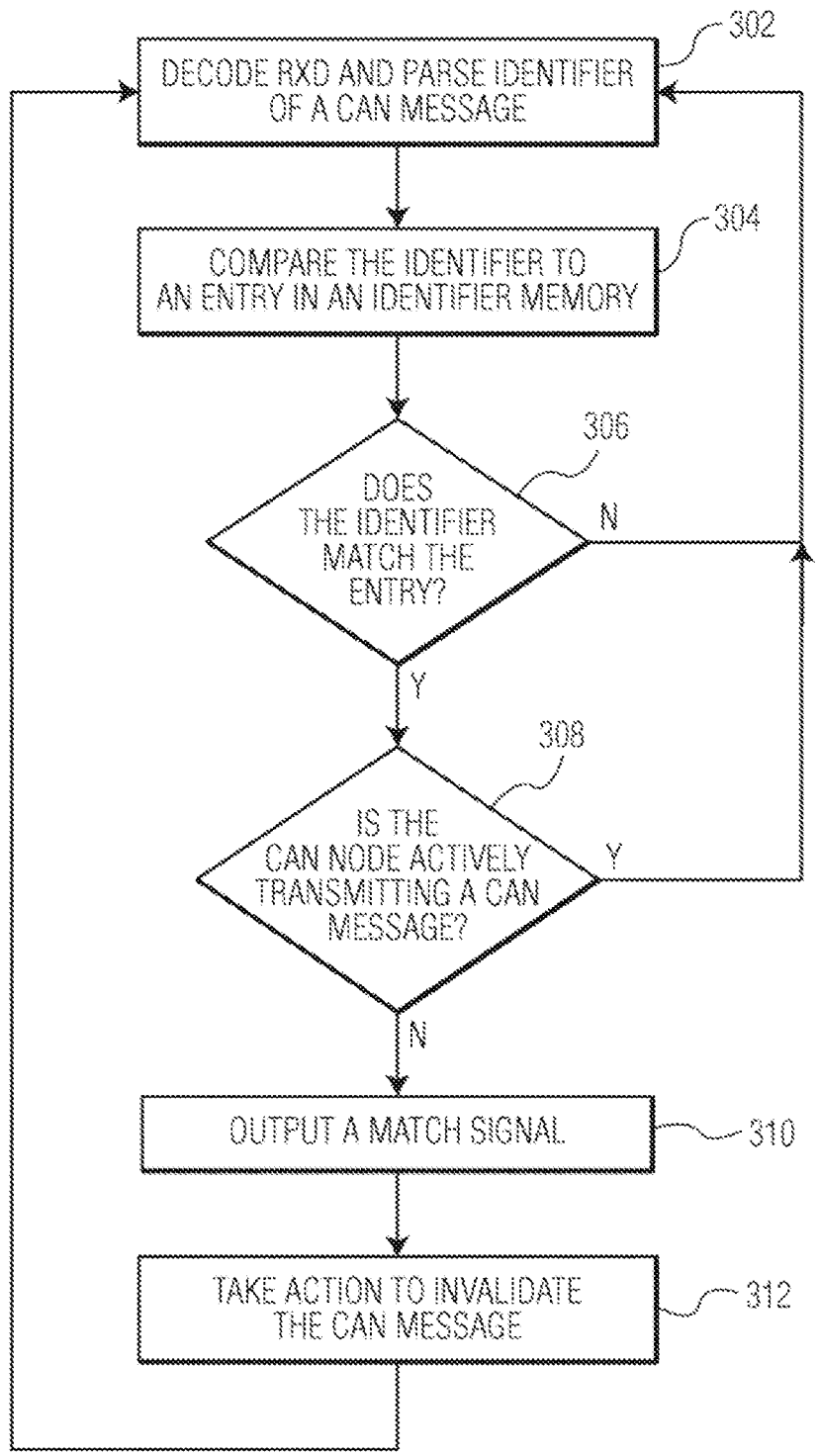
FIG. 15 is a process flow diagram of a technique for implementing intrusion detection/prevention in a CAN network.

FIG. 15 is a process flow diagram of a technique for implementing intrusion detection/prevention in a CAN network. At block 302, RXD is decoded and the identifier of a CAN message is parsed. In an embodiment, the identifier is received at a CAN device via a CAN bus. At block 304, the identifier is compared to an entry in an identifier memory. At decision point 306, it is determined if there is a match between the identifier and the stored identifier. If there is no match, the process returns to block 302. If there is a match, then at decision point 308, it is determined if the CAN node is actively transmitting. If the CAN node is actively transmitting, then the process returns to block 302. The process returns to block 202 at least because it is assumed that the received identifier is from the CAN message that was sent by the CAN node itself. If the CAN node is not actively transmitting, then at block 310, a match signal is output. At block 312, some action is taken to invalidate the CAN message. For example, the recessive bit directly after the FDF bit position is made dominant as described above to cause the invalidation of the CAN message in the other CAN nodes coupled to the bus 104.

Figure 16:
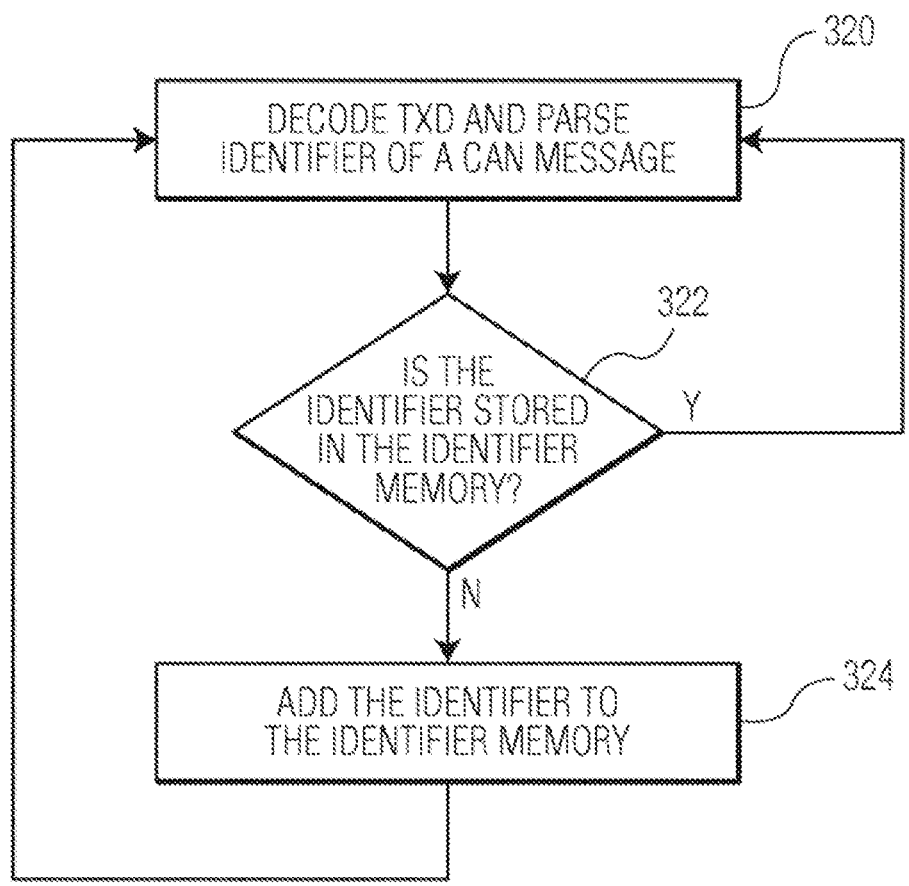
FIG. 16 is a process flow diagram of a technique for populating an identifier memory for implementing intrusion detection/prevention in a CAN network.

FIG. 16 is a process flow diagram of a technique for populating an identifier memory for implementing intrusion detection/prevention in a CAN network. At block 320, TXD is decoded and the identifier of a CAN message is parsed. At decision point 322, it is determined if the identifier is already stored in an identifier memory. If the identifier is already stored in the identifier memory, then the process returns to block 320. If the identifier in not already stored in the identifier memory, then at block 324 the identifier is added to the identifier memory and the process returns to block 320.

In an embodiment, the above-described intrusion detection/prevention techniques can be implemented in a CAN device such as a CAN transceiver IC device, a microcontroller IC device, or an IC device that includes both a CAN transceiver and a microcontroller.

Figure 17:
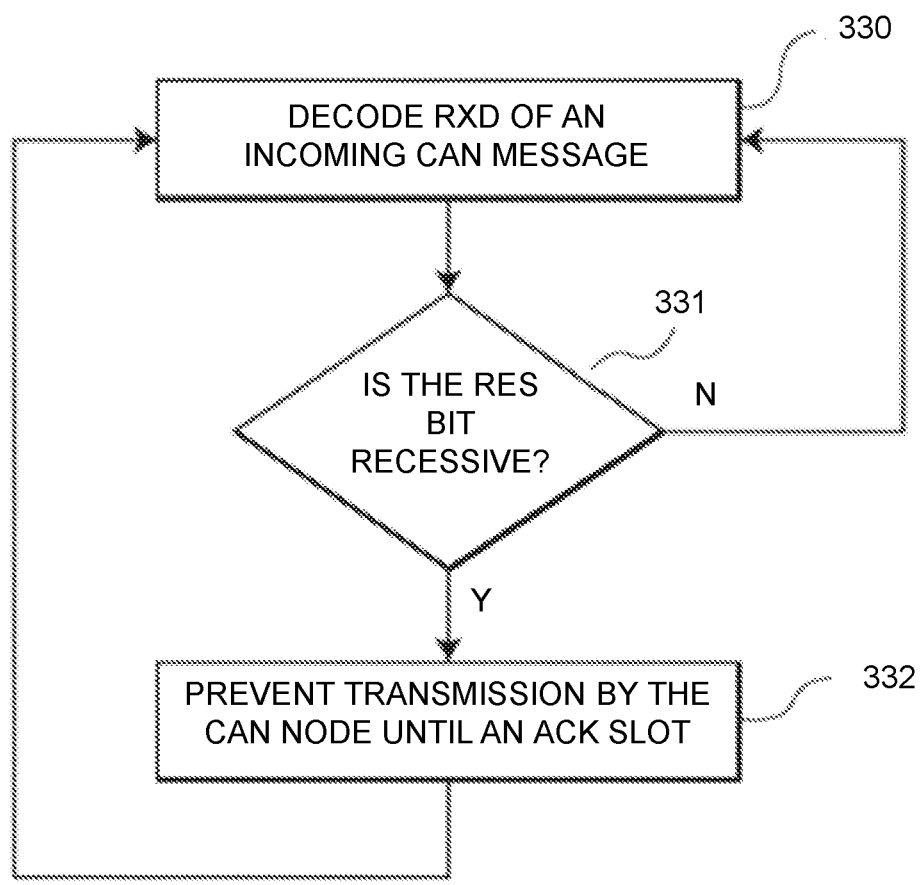
FIG. 17 is a process flow diagram of a technique for control of transmission by a CAN node during transmission of a CAN XL frame by another node.

FIG. 17 discloses further functionality that may be provided by the CAN node 102. At block 330, RXD is decoded, that is an incoming CAN message received from the CAN bus is decoded. The bit in the bit position directly after the FDF field may be identified and parsed. At decision point 331, it is determined if the bit in the bit position directly after the FDF field is recessive. If the bit directly after the FDF field is dominant, then the process returns to block 330 and the process is repeating for the next CAN message that is received on RXD. If the bit directly after the FDF field is recessive, then at block 332 the CAN node is configured to prevent transmission by the CAN node until an ACK or acknowledgement slot (see ACK in FIGS. 3A and 3B) or, in another embodiment, until the bit rate has been changed from fast to slow. Information designating the change in bit rate speed may be provided by receiver 136 to show whether the bus is in the CANXL-fast phase or not. Thus, a threshold rate may be used that is less than the fast rate and above or at the slow rates such that when the CAN slow rate phase has resumed, action can be taken. The process returns to block 330. Thus, a recessive bit directly after the FDF field provides for said prevention of transmission, while a dominant bit directly after the FDF field does not lead to said prevention of transmission.

The functionality of FIG. 17 may be implemented by the compare module 160 or may be provided by a further module that may be part of the CAN transceiver, CAN protocol controller or a module separate therefrom as disclosed above with respect to the compare module 160.

To implement said prevention of transmission by the CAN node in block 332, the compare module 160 may be configured to not pass signalling received on TXD from the CAN protocol controller 114 to the CAN transceiver 120 for the time period between the time of the bit following FDF, i.e. at the end of the bit following FDF, and the time of the ACK slot. The ACK slot is shown in FIG. 3A and FIG. 3B as ACK and ACK DEL. In another example, the compare module 160 (or further module depending on how the functionality is implemented) may prevent said transmission by disabling the transmitter of the CAN transceiver. In another example, the compare module 160 (or further module depending on how the functionality is implemented) may prevent said transmission by providing an instructing signal to the CAN protocol controller. Thus, in one or more examples, the CAN decoder 166 or other decoder is further configured to decode the bit following the FDF bit of a CAN message received from the RXD input interface. The compare logic 164 or other compare logic is configured to determine whether or not the bit following the FDF bit is recessive and to output a disable signal when the bit following the FDF bit is recessive. The CAN device, in response to the disable signal, is configured to prevent transmission by the CAN transceiver 120 to the CAN bus 104 until a beginning of an ACK slot. In an alternative, until the bit rate changes to the "slow" CAN/CAN FD rate. Accordingly, the CAN decoder 166 or other decoder may be configured to watch said CAN message and at times thereafter for said ACK slot or the bit rate change.

In one or more examples, the CAN device is configured to prevent transmission by the CAN transceiver 120 by blocking signalling from a CAN protocol controller 114 from onward transmission to the CAN transceiver 120, wherein the compare module 160 further includes a transmit data, TXD, input interface 168A configured to receive data from the CAN protocol controller 114.

In one or more examples, the CAN device is configured to prevent transmission by the CAN transceiver 120 by transmitting a message to the CAN protocol controller 114 instructing it not to generate signalling for the CAN transceiver 120 until the beginning of the ACK slot. Thus, the CAN protocol controller 114 may be configured to respond accordingly to said signalling.

In one or more examples, the CAN device is configured to prevent transmission by the CAN transceiver 120 by disabling one or more transmitters 138 of the CAN transceiver 120 used to transmit signalling to the CAN bus 104. Thus, the transmitter 138 may include an enable terminal configured to receive a signal that defines when the transmitter 138 can transmit. The CAN device may be configured to control or interrupt said enable signal.

In an embodiment, "CAN messages" refers to CAN "data frames," which are CAN frames with the RTR bit set to "0" as specified in the CAN protocol. CAN "data frames" are the CAN frames that carry payload data (e.g., in the DATA field) that could be used for malicious intent and thus the CAN "data frames" are important to monitor for intrusion detection/prevention. CAN frames with the RTR bit set to "1" are referred to in the protocol as "remote frames" and such frames do not include payload data because the function of "remote frames" is simply to request transmission of a CAN data frame with the same identifier. Remote frames with the same identifier as a corresponding CAN data frame can be transmitted by all of the other CAN nodes (e.g., all of the CAN nodes other than the CAN node that is in charge of sending the Data Frame with the same identifier). Therefore, it would not make sense to store an identifier of an outgoing CAN remote frame, and it would not make sense to check an incoming CAN remote frame for a matching identifier.

In some embodiments, a match of all bits of an identifier produces a match signal. In other embodiments, a match of less than all of the bits of an identifier may produce a match signal.

In an embodiment, the above-described functionality to invalidate a CAN message is applicable to CAN, CAN-FD, CAN XL and ISO 11898 compliant networks. The functionality may also applicable to other network protocols that are often used in vehicles such as Local Interconnect Network (LIN) and FLEXRAY protocols.

According to an example, a Controller Area Network (CAN) device is provided, which comprises a compare module configured to interface with a CAN transceiver. The compare module has a receive data (RXD) interface, a CAN decoder, an identifier memory, compare logic and a signal generator. The receive data (RXD) interface is configured to receive data from the CAN transceiver. The CAN decoder is configured to decode an identifier of a CAN message received from the RXD interface. The identifier memory is configured to store an entry that corresponds to at least one identifier. The compare logic is configured to compare a received identifier from a CAN message to the entry that is stored in the identifier memory and to output a match signal when the comparison indicates that the received identifier of the CAN message matches the entry that is stored at the CAN device. The signal generator is configured to output, in response to the match signal, a signal to invalidate the CAN message.

According to an example, the signal generator generates an error signal to invalidate the CAN message. According to an example, the CAN device is further configured to output the error signal onto a CAN bus to invalidate the CAN message. According to an example, the identifier memory is configured to store one or more identifiers. According to an example, the identifier memory is configured to store an identifier mask that corresponds to a group of identifiers. According to an example, the compare logic is further configured to output the match signal when both the comparison indicates that the received identifier of the CAN message matches the entry that is stored at the CAN device and the CAN device is not currently transmitting a CAN message with the received identifier. According to an example, the compare module further includes a transmit data (TXD) input interface configured to receive data from a CAN protocol controller and wherein the compare logic is further configured to populate the identifier memory with an identifier of a CAN message received at the TXD input interface. According to an example, an identifier is added to the identifier memory if the identifier is not already stored in the identifier memory. According to an example, a CAN transceiver integrated circuit device is provided, which comprises a receiver, a transmitter, a CAN bus interface, an RXD interface, a TXD interface, and the CAN device as exemplified above. According to an example, a microcontroller integrated circuit device is provided, comprises CAN protocol controller and the CAN device as exemplified above. According to an example, an integrated circuit device is provided, which comprises a CAN transceiver, a CAN protocol controller, and the CAN device as exemplified above. According to an example, a method for controlling Controller Area Network (CAN) traffic is provided. An identifier of a CAN message is received at a CAN device. The identifier is received at the CAN device via a CAN bus. The identifier of the CAN message is compared to an entry in an identifier memory at the CAN device. A match signal is output when the comparison indicates that the identifier from the CAN message matches the entry in the identifier memory. The CAN message is invalidated in response to the match signal. According to an example, invalidating the CAN message comprises sending an error signal onto the CAN bus. According to an example, invalidating the CAN message comprises notifying a CAN protocol controller to invalidate the CAN message at the CAN device. According to an example, comparing the identifier of the CAN message with an entry in an identifier memory comprises at least one of comparing the identifier to one or more stored identifiers or comparing the identifier memory to a mask that corresponds to a group of identifiers. According to an example, the identifier of a CAN message that is to be transmitted from the CAN device is identified and the identifier is stored in an identifier memory at the CAN device. According to an example, in an initial step an identifier of a CAN message from a TXD path is decoded and the decoded identifier is stored in an identifier memory at the CAN device. According to an example, an identifier is added to the identifier memory if the identifier is from a CAN message that is transmitted from the CAN device and the identifier is not already stored in the identifier memory. According to an example, the identifier of the CAN message is compared with the entry in the identifier memory before the CAN message is provided to a CAN protocol controller. According to an example, a Controller Area Network (CAN) device is provided, which comprises a CAN transceiver, a CAN protocol controller and a compare module. The compare module is located in a signal path between the CAN transceiver and the CAN protocol controller. The compare module has a receive data (RXD) input interface, a CAN decoder, an identifier memory and compare logic. The receive data (RXD) input interface is configured to receive data from the CAN transceiver via a CAN bus. The CAN decoder is configured to decode an identifier of a CAN message received from the RXD input interface. The identifier memory is configured to store an entry that corresponds to at least one identifier. The compare logic is configured to compare a received identifier from a CAN message with the entry that is stored in the identifier memory and to output a match signal when the comparison indicates that the received identifier of the CAN message matches the entry that is stored at the CAN device.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A Controller Area Network (CAN) device comprising:
a compare module configured to interface with a CAN transceiver that is configured to be coupled to a CAN bus, the compare module having;
a receive data (RXD) input interface configured to receive data from the CAN transceiver;
a transmit data (TXD) output interface configured to output data to the CAN transceiver;
a CAN decoder configured to decode an identifier of a CAN message received from the RXD input interface;
an identifier memory configured to store an entry that corresponds to at least one identifier;
compare logic configured to compare a received identifier from the CAN message to the entry that is stored in the identifier memory and to output a match signal when the comparison indicates that the received identifier of the CAN message matches the entry that is stored at the CAN device;
a signal generator configured to output, in response to the match signal, an invalidation signal to invalidate the CAN message, wherein the invalidation signal is output from the TXD output interface to the CAN transceiver;
wherein the invalidation signal generated by the signal generator provides for one or more dominant bits that are timed so that one or more bits at bit positions immediately following a Flexible Data Rate Format (FDF) field of the CAN message is made dominant; or the FDF field of the CAN message is made dominant.

2. The CAN device of claim 1, wherein said invalidation signal is configured to cause said CAN transceiver to provide signalling to the CAN bus that provides said one or more dominant bits that are timed so that at least a bit immediately following the FDF field or FDF field of the CAN message is made dominant.

3. The CAN device of claim 1, wherein said signal generator is configured to provide signalling to the CAN bus that provides said one or more dominant bits that are timed so that at least the bit immediately following the FDF field or the FDF field of the CAN message is made dominant.

4. The CAN device of claim 1, wherein:
the CAN decoder is further configured to decode the bit immediately following the FDF field of the CAN message received from the RXD input interface;
the compare logic is configured to determine whether or not said bit immediately following the FDF field of the CAN message is recessive and to output a disable signal when said bit is recessive; and
the CAN device, in response to the disable signal, is configured to prevent transmission by the CAN transceiver to the CAN bus until a beginning of an ACK slot or until an indication that a bit rate used on the bus is below a threshold rate.

5. The CAN device of claim 1, wherein
the CAN decoder is further configured to decode the bit immediately following a FDF field of CAN message received from the RXD input interface;
the compare logic is configured to determine whether or not said bit immediately following the FDF field of the CAN message is recessive and to output the disable signal when said bit is recessive; and
the CAN device, in response to the disable signal, is configured to prevent transmission by the CAN transceiver to the CAN bus until an indication that a bit rate used on the bus is below a threshold rate.

6. The CAN device of claim 5, wherein said indication that the bit rate used on the bus is below the threshold rate comprises information indicating use of a classical CAN bit rate.

7. The CAN device of claim 4 wherein said CAN device is configured to prevent transmission by the CAN transceiver by blocking signalling from a CAN protocol controller from onward transmission to the CAN transceiver, wherein the compare module further includes a transmit data (TXD) input interface configured to receive data from the CAN protocol controller.

8. The CAN device of claim 4 wherein said CAN device is configured to prevent transmission by the CAN transceiver by transmitting a message to a CAN protocol controller instructing it not to generate signalling for the CAN transceiver until the beginning of the ACK slot or until said indication that the bit rate used on the bus is below a threshold rate.

9. The CAN device of claim 4 wherein said CAN device is configured to prevent transmission by the CAN transceiver by disabling one or more transmitters of the CAN transceiver used to transmit signalling to the CAN bus.

10. The CAN device of claim 1, wherein the identifier memory is configured to store one or more identifiers.

11. The CAN device of claim 1, wherein the identifier memory is configured to store an identifier mask that corresponds to a group of identifiers.

12. The CAN device of claim 1, wherein the compare logic is further configured to output the match signal when both the comparison indicates that the received identifier of the CAN message matches the entry that is stored at the CAN device and the CAN device is not currently transmitting a CAN message with the received identifier.

13. The CAN device of claim 1, wherein the compare module further includes a transmit data (TXD) input interface configured to receive data from a CAN protocol controller and wherein the compare logic is further configured to populate the identifier memory with an identifier of a CAN message received at the TXD input interface.

14. The CAN device of claim 1, wherein signal generator is further configured to provide for transmission of an error signal onto the CAN bus, said error signal being in an End of Frame field.

15. A method for controlling Controller Area Network (CAN) traffic, the method comprising:

receiving an identifier of a CAN message at a CAN device, the identifier received at the CAN device via a CAN bus;

comparing the identifier of the CAN message to an entry in an identifier memory at the CAN device;

outputting a match signal when the comparison indicates that the identifier from the CAN message matches the entry in the identifier memory; and invalidating the CAN message, by generating an invalidation signal to invalidate the CAN message in response to the match signal, wherein the invalidation signal provides for at least one of: one or more bits at bit positions immediately following a CAN Flexible Data Rate (FDF) field is made dominant; and the FDF field is made dominant.

16. The method of claim 15, wherein said invalidation signal is configured to cause said CAN transceiver to provide signalling to the CAN bus that provides said one or more dominant bits that are timed so that at least a bit immediately following the FDF field or the FDF field bit is made dominant.

17. The method of claim 15, wherein said invalidation signal is provided to the CAN bus.

18. The method of claim 15, wherein method includes:
decoding the bit immediately following a FDF field of the CAN message;

determining whether or not the bit immediately following the FDF field is recessive outputting a disable signal when the bit immediately following the FDF field is recessive; and preventing transmission by the CAN transceiver to the CAN bus until a beginning of an ACK slot or until an indication that a bit rate used on the CAN bus is below a threshold rate, in response to the disable signal.

19. The method of claim 18 wherein said CAN device is configured to prevent transmission by the CAN transceiver by one or more of:

blocking signalling from a CAN protocol controller from onward transmission to the CAN transceiver;

transmitting a message to a CAN protocol controller instructing it not to generate signalling for the CAN transceiver until the beginning of the ACK slot or until said indication that the bit rate used on the bus is below a threshold rate;

disabling one or more transmitters of the CAN transceiver used to transmit signalling to the CAN bus.

20. The method of claim 15, wherein the outputting the match signal is performed when both the comparison indicates that the received identifier of the CAN message matches the entry that is stored at the CAN device and the CAN device is not currently transmitting a CAN message with the received identifier.

* * * * *